United States Patent
Tan et al.

(10) Patent No.: US 11,729,141 B2
(45) Date of Patent: Aug. 15, 2023

(54) NETWORK CONNECTION SYSTEMS AND METHODS AND NETWORK ACCESS DEVICES

(71) Applicant: ZHEJIANG DAHUA TECHNOLOGY CO., LTD., Zhejiang (CN)

(72) Inventors: Shenqiu Tan, Hangzhou (CN); Hui Li, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/654,811

(22) Filed: Mar. 14, 2022

(65) Prior Publication Data

US 2022/0210117 A1 Jun. 30, 2022

Related U.S. Application Data

(63) Continuation of application No. PCT/CN2020/111254, filed on Aug. 26, 2020.

(30) Foreign Application Priority Data

Sep. 16, 2019 (CN) .......................... 201910872016.4

(51) Int. Cl.
*H04L 61/5014* (2022.01)
*H04L 61/5046* (2022.01)
*H04L 61/5069* (2022.01)

(52) U.S. Cl.
CPC ...... *H04L 61/5014* (2022.05); *H04L 61/5046* (2022.05); *H04L 61/5069* (2022.05)

(58) Field of Classification Search
CPC ............ H04L 61/5014; H04L 61/5046; H04L 61/5069

(Continued)

(56) References Cited

U.S. PATENT DOCUMENTS 6,263,369 B1* 7/2001 Sitaraman ............... H04L 63/08
709/219
9,436,820 B1* 9/2016 Gleichauf ............... H04L 63/02
(Continued)

FOREIGN PATENT DOCUMENTS

CN 101217575 A 7/2008
CN 102215486 A 10/2011
(Continued)

OTHER PUBLICATIONS

International Search Report in PCT/CN2020/111254 dated Oct. 28, 2020, 4 pages.
(Continued)

*Primary Examiner* — Tauqir Hussain
(74) *Attorney, Agent, or Firm* — Metis IP LLC

(57) ABSTRACT

The present disclosure relates to network connection methods and devices for connecting a terminal device to a network through a network access device. The network access device may include a processor and a connection configuration component. The processor receives a connection request from the terminal device. The processor also authenticates the terminal device based on the connection request, and obtains a verified Internet protocol (IP) address from the connection configuration component. The processor further transmits the verified IP address to the terminal device after the terminal device is authenticated, wherein the terminal device is configured to be connected to the network by using the verified IP address.

11 Claims, 10 Drawing Sheets

(58) Field of Classification Search
USPC .......................................................... 709/228
See application file for complete search history.

(56) References Cited

U.S. PATENT DOCUMENTS

| | | | | |
|---|---|---|---|---|
| 9,686,269 | B2* | 6/2017 | Fu | G06F 21/335 |
| 10,097,538 | B1* | 10/2018 | Sanchez | H04L 63/083 |
| 10,187,475 | B2* | 1/2019 | Choquette | H04L 67/56 |
| 2002/0138635 | A1* | 9/2002 | Redlich | H04L 63/0442 |
| | | | | 709/229 |
| 2003/0167411 | A1* | 9/2003 | Maekawa | H04L 63/08 |
| | | | | 726/4 |
| 2004/0172559 | A1* | 9/2004 | Luo | H04L 63/104 |
| | | | | 713/163 |
| 2005/0216769 | A1* | 9/2005 | Matsuoka | H04L 63/0823 |
| | | | | 726/5 |
| 2008/0069105 | A1* | 3/2008 | Costa | H04L 63/0853 |
| | | | | 370/392 |
| 2008/0101240 | A1* | 5/2008 | Rohilla | H04L 63/10 |
| | | | | 370/236 |
| 2011/0071914 | A1* | 3/2011 | Beasley | G06Q 20/202 |
| | | | | 705/41 |
| 2011/0239291 | A1* | 9/2011 | Sotka | H04L 63/1416 |
| | | | | 726/14 |
| 2012/0054843 | A1* | 3/2012 | Horman | H04L 63/0823 |
| | | | | 726/7 |
| 2013/0031615 | A1* | 1/2013 | Woodward | H04W 8/02 |
| | | | | 726/4 |
| 2013/0336240 | A1* | 12/2013 | Cherian | H04W 28/0205 |
| | | | | 370/329 |
| 2014/0153513 | A1* | 6/2014 | Lee | H04L 61/5014 |
| | | | | 370/329 |
| 2014/0254500 | A1* | 9/2014 | Alavudin | H04W 72/044 |
| | | | | 370/329 |
| 2014/0380434 | A1* | 12/2014 | Li | H04M 15/93 |
| | | | | 726/4 |
| 2015/0043561 | A1* | 2/2015 | Xia | H04W 12/06 |
| | | | | 370/338 |
| 2016/0054962 | A1* | 2/2016 | Park | H04W 12/50 |
| | | | | 358/1.15 |
| 2017/0318010 | A1* | 11/2017 | Fu | G06F 21/316 |
| 2018/0302439 | A1* | 10/2018 | Hoffmann | H04L 47/12 |
| 2022/0210192 | A1* | 6/2022 | Lear | H04L 61/5014 |

FOREIGN PATENT DOCUMENTS

| | | |
|---|---|---|
| CN | 102282800 A | 12/2011 |
| CN | 102388639 A | 3/2012 |
| CN | 103297968 A | 9/2013 |
| CN | 104540185 A | 4/2015 |
| CN | 104640111 A | 5/2015 |
| CN | 106535171 A | 3/2017 |
| CN | 107613497 A | 1/2018 |
| CN | 107659935 A | 2/2018 |
| CN | 108600404 A | 9/2018 |
| CN | 108650336 A | 10/2018 |
| WO | 2021052122 A1 | 3/2021 |

OTHER PUBLICATIONS

Written Opinion in PCT/CN2020/111254 dated Oct. 28, 2020, 6 pages.
First Office Action in Chinese Application No. 201910872016.4 dated Jan. 27, 2021, 15 pages.

* cited by examiner

NETWORK CONNECTION SYSTEMS AND METHODS AND NETWORK ACCESS DEVICES

CROSS-REFERENCE TO RELATED APPLICATIONS

This application is a continuation of International Application No. PCT/CN2020/111254, filed on Aug. 26, 2020, which claims priority of Chinese Patent Application No. 201910872016.4, filed on Sep. 16, 2019, the contents of which are incorporated herein by reference.

TECHNICAL FIELD

The present disclosure generally relates to network technology, and more particularly, relates to systems and methods for allocating an Internet protocol (IP) address for establishing a network connection.

BACKGROUND

With the development of modern communication, network technology has emerged. Conventional networking involves interactions between a network access device (e.g., a router) and a terminal device via a large number of messages. For example, to obtain an IP address, the terminal device interacts with a dynamic host control protocol (DHCP) server via four messages. However, failures usually occur in the transmission of the large number of messages in the interactions. Thus, it is desirable to develop a system and method for network connection having a higher success rate and being more efficient.

SUMMARY

According to a first aspect of the present disclosure, a method for connecting a terminal device to a network through a network access device is provided. The network access device includes a processor and a connection configuration component. The method may comprise receiving, by the processor, a connection request from the terminal device; authenticating, by the processor, the terminal device based on the connection request; obtaining, by the processor, a verified Internet protocol (IP) address from the connection configuration component; and transmitting, by the processor, the verified IP address to the terminal device after the terminal device is authenticated, wherein the terminal device is configured to be connected to the network by using the verified IP address.

In some embodiments, transmitting the verified IP address to the terminal device includes transmitting the verified IP address to the terminal device in a handshake protocol.

In some embodiments, the handshake protocol includes a four-way handshake.

In some embodiments, transmitting the verified IP address to the terminal device in the handshake protocol includes filling the verified IP address into an information element (IE) field of an extensible authentication protocol over local area network (EAPOL) message in the four-way handshake; and transmitting the verified IP address to the terminal device through the EAPOL message.

In some embodiments, the IP address is verified according to a verification approach, the verification approach including obtaining a candidate IP address from the connection configuration component; verifying a validity of the candidate IP address by detecting a conflict regarding the candidate IP address in the network; and in response to that the candidate IP address is valid, designating the candidate IP address as the verified IP address.

In some embodiments, the method further includes in response to that the candidate IP address is invalid, obtaining a new IP address from the connection configuration component, and verifying a validity of the new IP address according to the verification approach.

In some embodiments, authenticating the terminal device based on the connection request includes transmitting a challenge request to the terminal device; receiving response information regarding the challenge request from the terminal device; and authenticating the terminal device based on the response information.

In some embodiments, the connection configuration component includes a dynamic host configuration protocol (DHCP) server.

According to a second aspect of the present disclosure, a method for connecting a terminal device to a network through a network access device is provided. The method may comprise transmitting, by the terminal device, a connection request to the network access device; receiving, by the terminal device, a challenge request for an authentication of the terminal device from the network access device; transmitting, by the terminal device, response information regarding the challenge request to the network access device; and receiving, by the terminal device, a verified Internet protocol (IP) address from the network access device after the terminal device is authenticated, wherein the terminal device is configured to be connected to the network via the verified IP address.

In some embodiments, receiving the verified IP address from the network access device includes receiving the IP address from the network access device in a handshake protocol.

In some embodiments, the handshake protocol includes a four-way handshake.

In some embodiments, the verified IP address is filled into an information element (IE) field of an extensible authentication protocol over local area network (EAPOL) message in the four-way handshake.

In some embodiments, the verified IP address is valid in the network.

In some embodiments, the connection configuration component includes a dynamic host configuration protocol (DHCP) server.

According to a third aspect of the present disclosure, a method for connecting a terminal device to a network through a network access device is provided. The method may comprise receiving, by the network access device, a connection request from a terminal device; authenticating, by the network access device, the terminal device based on the connection request; generating, by the network access device, a verified Internet protocol (IP) address; and transmitting, by the network access device, the verified IP address to the terminal device after the terminal device is authenticated, wherein the terminal device is configured to be connected to the network by using the verified IP address.

According to a fourth aspect of the present disclosure, a network access device for connecting a terminal device to a network is provided. The network access device may include a processor and a connection configuration component. The processor may be configured to perform operations comprising receiving a connection request from the terminal device; authenticating the terminal device based on the connection request; obtaining a verified Internet protocol (IP) address from the connection configuration component;

and transmitting the verified IP address to the terminal device after the terminal device is authenticated, wherein the terminal device is configured to be connected to the network by using the verified IP address.

According to a fifth aspect of the present disclosure, a terminal device that is connected to a network through a network access device is provided. The terminal device may be configured to perform operations comprising transmitting a connection request to the network access device; receiving a challenge request for an authentication of the terminal device from the network access device; transmitting response information regarding the challenge request to the network access device; and receiving a verified Internet protocol (IP) address from the network access device after the terminal device is authenticated, wherein the terminal device is configured to be connected to the network via the verified IP address.

According to a sixth aspect of the present disclosure, a network access device for connecting a terminal device to a network is provided. The network access device may include a processor and a connection configuration component. The network access device may be configured to perform operations comprising receiving a connection request from a terminal device; authenticating the terminal device based on the connection request; generating a verified Internet protocol (IP) address; and transmitting the verified IP address to the terminal device after the terminal device is authenticated, wherein the terminal device is configured to be connected to the network by using the verified IP address.

According to a seventh aspect of the present disclosure, a non-transitory computer readable medium comprising at least one set of instructions for connecting a terminal device to a network through a network access device is provided. The network access device includes a processor and a connection configuration component. When executed by the processor, the at least one set of instructions causes the processor to perform one or more operations, the one or more operations comprising receiving a connection request from the terminal device; authenticating the terminal device based on the connection request; obtaining a verified Internet protocol (IP) address from the connection configuration component; and transmitting the verified IP address to the terminal device after the terminal device is authenticated, wherein the terminal device is configured to be connected to the network by using the verified IP address.

According to an eighth aspect of the present disclosure, a non-transitory computer readable medium comprising at least one set of instructions for connecting a terminal device to a network through a network access device is provided. When executed by the terminal device, the at least one set of instructions causes the terminal device to perform one or more operations, the one or more operations comprising transmitting a connection request to the network access device; receiving a challenge request for an authentication of the terminal device from the network access device; transmitting response information regarding the challenge request to the network access device; and receiving a verified Internet protocol (IP) address from the network access device after the terminal device is authenticated, wherein the terminal device is configured to be connected to the network via the verified IP address.

According to a ninth aspect of the present disclosure, a non-transitory computer readable medium comprising at least one set of instructions for connecting a terminal device to a network through a network access device is provided. The network access device includes a processor and a connection configuration component. When executed by the network access device, the at least one set of instructions causes the network access device to perform one or more operations, the one or more operations comprising receiving a connection request from a terminal device; authenticating the terminal device based on the connection request; generating a verified Internet protocol (IP) address; and transmitting the verified IP address to the terminal device after the terminal device is authenticated, wherein the terminal device is configured to be connected to the network by using the verified IP address.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, operations, elements, and/or components, but do not preclude the presence or addition of one or more other features, integers, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Figure 2:
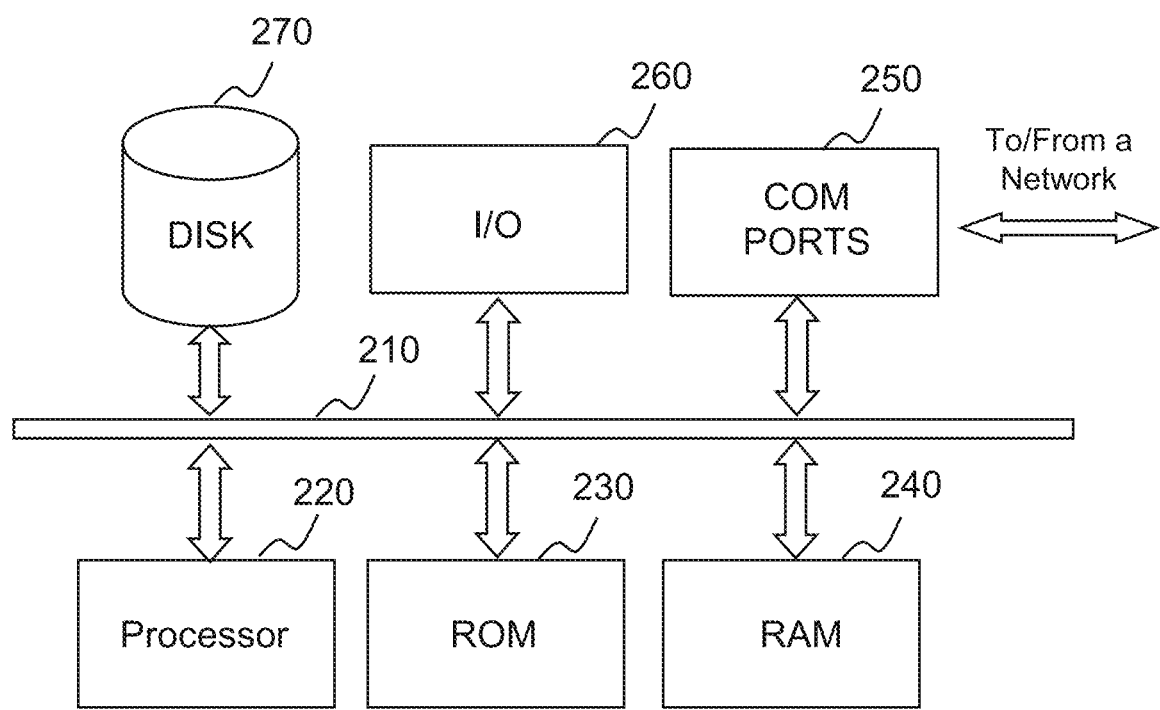
FIG. 2 is a schematic diagram illustrating exemplary hardware and/or software components of an exemplary network access device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on processing devices (e.g., processor 220 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing processing device, for execution by the processing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or processing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

An aspect of the present disclosure relates to a network connection system and method and a network access device. A terminal device may be connected to a network through the network access device. The network access device may be configured to authenticate the terminal device upon receiving a connection request from the terminal device. The network access device may include a connection configuration component (e.g., a dynamic host control protocol (DHCP) server), which may generate a verified Internet protocol (IP) address. The network access device may transmit the verified IP address to the terminal device after the terminal device is authenticated. In this way, the IP address that can be used by the terminal device may be generated by the network access device directly. Redundant communications between the terminal device and the network access device for IP verification via a plurality of messages in conventional IP address configuration processes may be omitted, thus improving a success rate of the network connection. Besides, the verified IP address may be transmitted to the terminal device in a message of a handshake (e.g., a four-way handshake), thereby improving the efficiency of the network connection.

Another aspect of the present disclosure relates to a terminal device. The terminal device may be connected to a network through a network access device. The terminal device may transmit a connection request to the network access device. Then the terminal device may be authenticated by receiving a challenge request for an authentication of the terminal device from the network access device, generating response information regarding the challenge request, and transmitting the response information to the network access device. After the terminal device is authenticated, the terminal device may receive a verified Internet protocol (IP) address directly from the network access device. The terminal device may be configured to be connected to the network via the verified IP address. In this way, redundant communications between the terminal device and the network access device via a plurality of messages in conventional IP address configuration processes may be omitted, thus improving a success rate and efficiency of the network connection.

Figure 1:
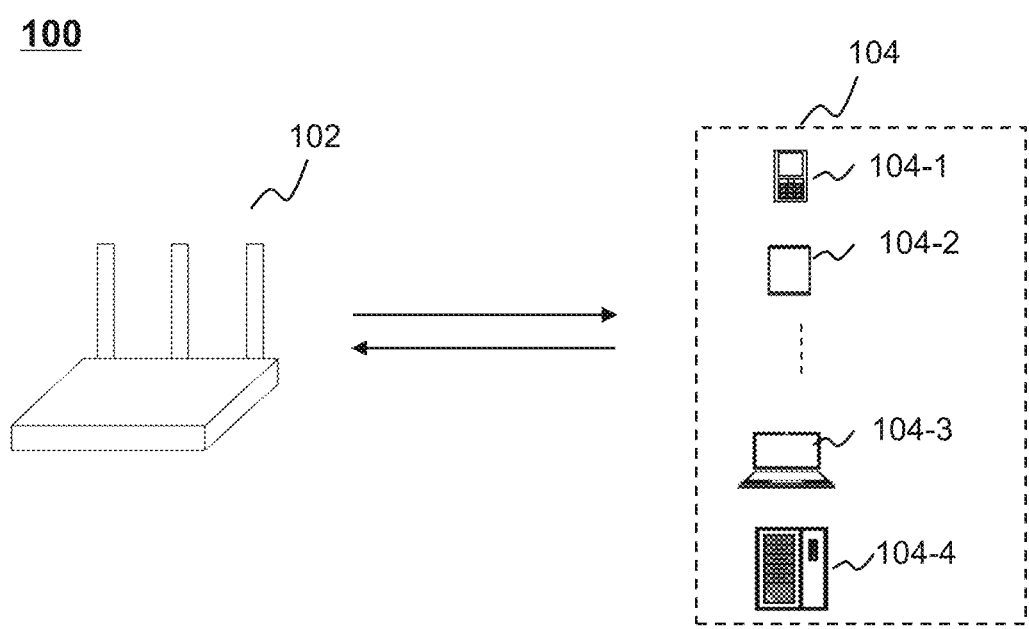
FIG. 1 is a schematic diagram illustrating an exemplary network connection system according to some embodiments of the present disclosure.

FIG. 1 is a schematic diagram illustrating an exemplary network connection system according to some embodiments of the present disclosure. The network connection system 100 may facilitate networking of a terminal device. As illustrated in FIG. 1, the network connection system 100 may include a network access device 102 and terminal device(s) 104. The network access device 102 and terminal device(s) 104 may be in a wired connection or a wireless connection.

The network access device 102 may interact with the terminal device(s) 104, and provide connection configurations for the terminal device(s) 104. The connection configurations may include, for example, IP addresses, subnet masks, standard gateways, DNS servers, proxy configurations, etc. The terminal device(s) 104 may connect to a network using the connection configurations.

The network may include any suitable network that can facilitate data communication. In some embodiments, the one or more terminal devices 104 may transmit to or receive from external devices (e.g., a cloud server, a terminal device, etc.) information and/or data via the network after the terminal device(s) 104 are connected to the network. In some embodiments, the network may be any type of wired or wireless network, or combination thereof. Merely by way of example, the network may include a cable network, a wireline network, an optical fiber network, a tele communications network, a wireless fidelity (WIFI) network, an intranet, an Internet, a local area network (LAN), a wide area network (WAN), a wireless local area network (WLAN), a metropolitan area network (MAN), a wide area network (WAN), a public telephone switched network (PSTN), a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a fifth generation (5G) mobile network, a sixth generation (6G) mobile network, a user datagram protocol (UDP) network, a transmission control protocol/Internet protocol (TCP/IP) network, a wireless application protocol (WAP) network, a ultra wide band (UWB) network, or the like, or any combination thereof. Merely for illustration purposes, the network disclosed in the present disclosure are described primarily regarding a WIFI network. It should be understood that this is only one exemplary embodiment, and not intended to be limiting.

In some embodiments, the network access device 102 may be a router. The router may be a device that communicates between the terminal device(s) 104 and the network. In some embodiments, the router may be a wireless router or a wired router. The router may facilitate data transmission between the terminal device(s) 104 and the network.

The router may transmit data in the form of data packets. In some embodiments, the router may transmit data packets according to layer 3 criteria. In alternative embodiments, the router may transmit data packets according to both layer 3 and layer 2 criteria.

In some embodiments, the network access device 102 may include a processing component and a connection configuration component. In some embodiments, the processing component may include one or more processing engines (e.g., single-core processing engine(s) or multi-core processor(s)). Merely by way of example, the processing device may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The connection configuration component may provide connection configurations for the terminal device(s) 104. The connection configurations may include, for example, IP addresses, subnet masks, standard gateways, DNS servers, proxy configurations, etc. In some embodiments, the connection configuration component may include a dynamic host control protocol (DHCP) server. The DHCP server may provide network administrative functions dynamically relying on the standard DHCP.

In some embodiments, the network access device 102 may further include a storage component. The storage component may store data and/or instructions. In some embodiments, the storage component may store data and/or instructions that the processing component may execute or use to perform exemplary methods described in the present disclosure. In some embodiments, the storage component may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage component may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the terminal devices(s) 104 may include a mobile device 104-1, a tablet computer 104-2, a laptop computer 104-3, a tabletop computer 104-4, or the like, or any combination thereof. In some embodiments, the mobile device 104-1 may include a smart home device, a wearable device, a smart mobile device, a virtual reality device, an augmented reality device, or the like, or any combination thereof. In some embodiments, the smart home device may include a camera. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, the terminal device(s) 104 may remotely operate one or more components of the network connection system 100.

It should be noted that the above description of the network connection system 100 is merely provided for the purposes of illustration, not intended to limit the scope of the present disclosure. For persons having ordinary skills in the art, components contained in the network connection system 100 may be combined or adjusted in various ways, or connected with other components as sub-systems, and various variations and modifications may be conducted under the teaching of the present disclosure. However, those variations and modifications may not depart the spirit and scope of this disclosure. In some embodiments, the network access device 102 may be any suitable device that can interact with the terminal device(s) 104, and provide connection configurations for the terminal device(s) 104. For example, the network access device 102 may be implemented by a mobile terminal, a laptop computer, a desktop computer, etc. All such modifications are within the protection scope of the present disclosure.

FIG. 2 is a schematic diagram illustrating exemplary hardware and/or software components of an exemplary processing device according to some embodiments of the present disclosure. In some embodiments, the network access device 102 may be implemented on the processing device 200 shown in FIG. 2. For example, the processing component of the network access device 102 may be implemented on the processing device 200 and configured to perform corresponding functions disclosed in this disclosure.

The processing device 200 may be used to implement any suitable component of the network connection system 100 as described herein. For example, the processing component of the network access device 102 may be implemented on the processing device 200, via its hardware, software program, firmware, or a combination thereof. Although only one such computer is shown, for convenience, the computer functions as described herein may be implemented in a distributed fashion on a number of similar platforms to distribute the processing load.

The processing device 200, for example, may include COM ports 250 connected to and from a network connected thereto to facilitate data communications. The processing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary processing device may further include program storage and data storage of different forms including, for example, a disk 270, and a read-only memory (ROM) 230, or a random-access memory (RAM) 240, for various data files to be processed and/or transmitted by the processing device. The exemplary processing device may also include program instructions stored in the ROM 230, RAM 240, and/or another type of non-transitory storage medium to be executed by the processor 220. The methods and/or processes of the present disclosure may be implemented as the program instructions. The processing device 200 may also include an I/O component 260, supporting input/output between the computer and other components. The processing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the processing device 200 executes both step A and step B, it should be understood that step A and step B may also be performed by two different processors 220 jointly or separately in the processing device 200 (e.g., a first processor executes step A and a second processor executes step B or the first and second processors jointly execute steps A and B).

Figure 3:
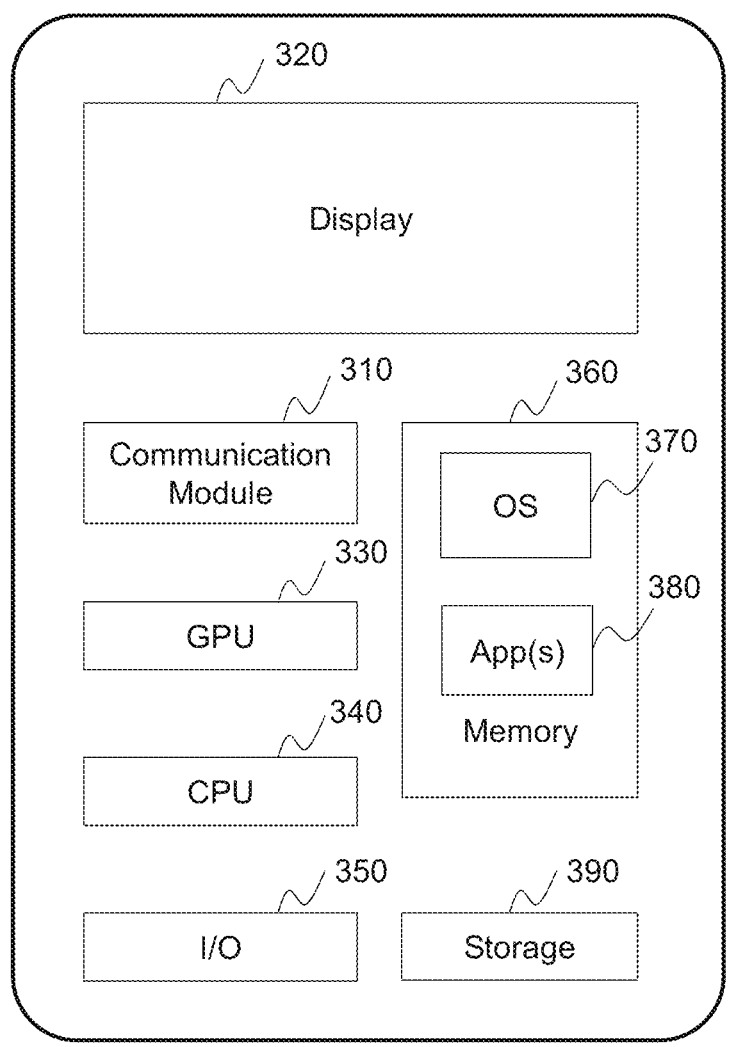
FIG. 3 is a schematic diagram illustrating hardware and/or software components of an exemplary mobile terminal according to some embodiments of the present disclosure.

FIG. 3 is a schematic diagram illustrating hardware and/or software components of an exemplary mobile terminal according to some embodiments of the present disclosure. As illustrated in FIG. 3, the mobile terminal 300 may include a communication module 310, a display 320, a graphics processing unit (GPU) 330, a central processing unit (CPU) 340, an I/O 350, a memory 370, and storage 390. In some embodiments, any other suitable component, including but not limited to a system bus or a controller (not shown), may also be included in the mobile terminal 300. In some embodiments, a mobile operating system 360 (e.g., iOS, Android, Windows Phone, etc.) and one or more applications 380 may be loaded into the memory 370 from the storage 390 in order to be executed by the CPU 340. The applications 380 may include a browser or any other suitable mobile apps for receiving and rendering information relating to data processing or other information from the network access device 102. User interactions with the information stream may be achieved via the I/O 350 and provided to the network access device 102 and/or other components of the network connection system 100.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate, e.g., a networking report as described below. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4A:
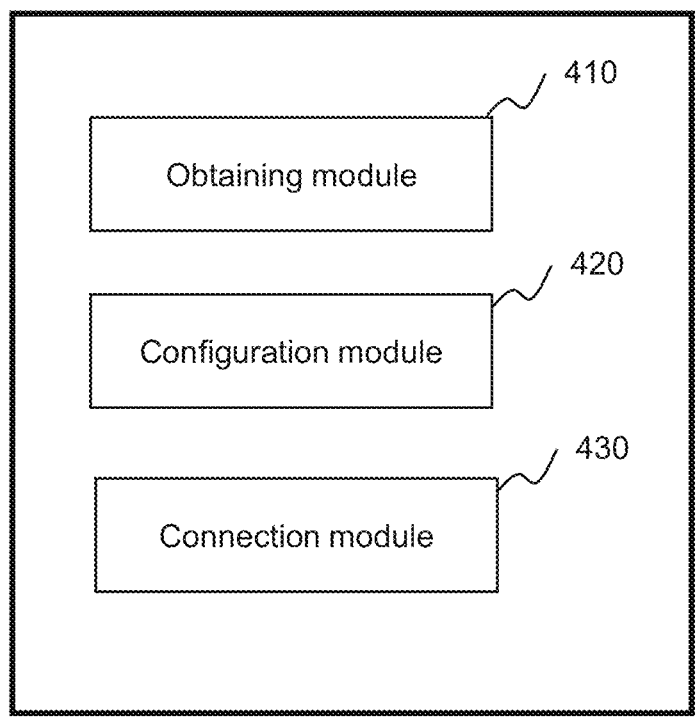
FIG. 4A is a block diagram illustrating an exemplary network access device according to some embodiments of the present disclosure.

FIG. 4A is a block diagram illustrating an exemplary network access device according to some embodiments of the present disclosure. The network access device 102 may include an obtaining module 410, a configuration module 420, and a transmitting module 430. One or more of the modules of the network access device 102 may be interconnected. The connection(s) may be wireless or wired. In some embodiments, at least a portion of the network access device 102 may be implemented on the processing device 200 as illustrated in FIG. 2 or the mobile device 300 as illustrated in FIG. 3.

The obtaining module 410 may obtain a connection request from a terminal device.

The obtaining module 410 may monitor connection requests sent by surrounding terminal devices (e.g., terminal device(s) 104 in a certain range centered by the network access device 102). In some embodiments, the obtaining module 410 may monitor connection requests sent by surrounding terminal devices in real time. For example, the obtaining module 410 may check whether there is a connection request sent by a terminal device per unit time (e.g., per second). In some embodiments, the obtaining module 410 may monitor connection requests sent by surrounding terminal devices at a time interval. For example, the obtaining module 410 may check whether there is a connection request sent by a terminal device at a regular interval (e.g., at an interval of 30 seconds) or an irregular interval.

In some embodiments, the connection request of a terminal device (e.g., the terminal device 104) may include request content, information of the terminal device, etc. The request content refers to content that the terminal device 104 requests in the connection request. For example, the request content may include a connection to a particular WIFI network and an Internet protocol (IP) address for connecting to the particular WIFI network. In some embodiments, the connection request may include at least one request parameter. The request content may be implemented in the at least one request parameter. In some embodiments, the at least one request parameter may include a primary IP address of the terminal device 104, for example, 0.0.0.0.

The configuration module 420 may authenticate the terminal device based on the connection request, and generate a verified Internet protocol (IP) address.

In some embodiments, upon receiving the connection request, the configuration module 420 may authenticate the terminal device 104 by recognizing identity information of the terminal device 104. The identity information may include, for example, an identity (ID) number, one or more keys, etc., of the terminal device 104. In some embodiments, in order to recognize the identity information of the terminal device 104, the configuration module 420 may transmit a challenge request to the terminal device 104. In some embodiments, the challenge request may include a request for the identity information of the terminal device. The terminal device 104 may generate response information regarding the challenge request and transmit the response information to the processing component. The response information may include the identity information of the terminal device 104.

Upon receiving the response information, the configuration module 420 may recognize the identity information of the terminal device 104. If the authentication of the terminal device 104 succeeds, the configuration module 420 may generate a verified IP address. In some embodiments, the configuration module 420 may include a DHCP server. The DHCP server may assign an IP address for the terminal device dynamically. In some embodiments, the IP address generated by the DHCP server may be verified according to a verification approach by the configuration module 420. The IP address verified according to the verification approach may also be referred to as verified IP address. In some embodiments, the DHCP server may also provide connection configuration information for the terminal device 104 dynamically. The connection configuration information may include, for example, subnet masks, standard gateways, DNS servers, proxy configurations, etc.

The transmitting module 430 may transmit the verified IP address to the terminal device after the terminal device is authenticated. The terminal device may be connected to the network using the verified IP address.

After the terminal device is authenticated, the verified IP address may be transmitted to the terminal device 104 such that a connection between the terminal device 104 and the network may be established using the verified IP address. In some embodiments, the verified IP address may be sent to the terminal device 104 in a handshake protocol. As used herein, the handshake protocol refers to a type of network authentication protocol that facilitates identity recognition between the network access device 102 and the terminal device 104. The handshake protocol may involve standards set up for the construction and use of the network, and provide a secure authentication for data delivered through the network.

The handshake protocol may include a three-way handshake protocol, a four-way handshake protocol, etc. For illustration purposes, the four-way handshake protocol may be implemented by transmission of four messages. In some embodiments, the verified IP address may be embodied in one of the four messages. For example, the processing component may fill the verified IP address into an information element (IE) field of an extensible authentication protocol over local area network (EAPOL) message in the four-way handshake. The verified IP address may be transmitted to the terminal device 104 through the EAPOL message. The terminal device may obtain the verified IP address from the EAPOL message, and connect to the network (e.g., the particular WIFI network) via the network access device 102 using the verified IP address.

It should be noted that the above description of the network access device 102 is merely provided for the purposes of illustration, and not intended to limit the scope of the present disclosure. For persons having ordinary skills in the art, multiple variations and modifications may be made under the teachings of the present disclosure. For example, the network access device 102 may further include a storage module facilitating data storage. However, those variations and modifications do not depart from the scope of the present disclosure.

Figure 4B:
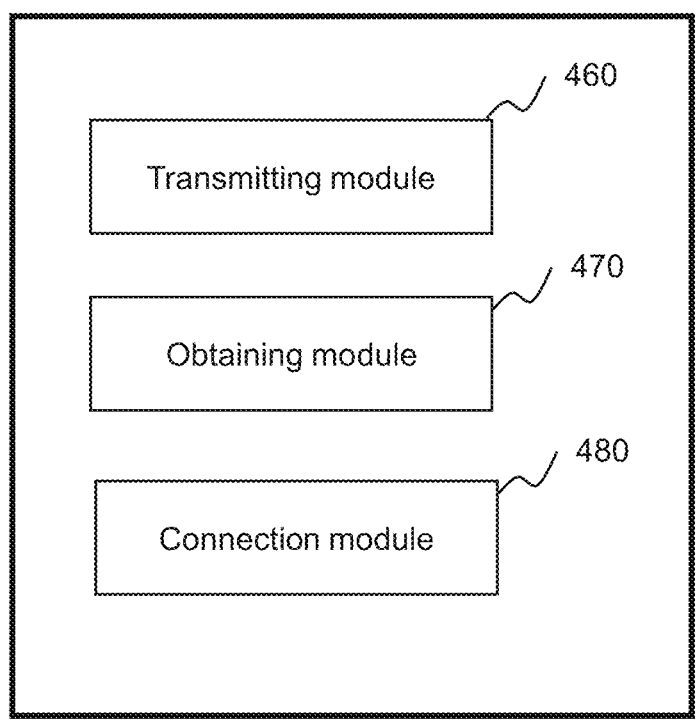
FIG. 4B is a block diagram illustrating an exemplary terminal device according to some embodiments of the present disclosure.

FIG. 4B is a block diagram illustrating an exemplary terminal device according to some embodiments of the present disclosure. The terminal device 104 may include a transmitting module 460, an obtaining module 470, and a connection module 480. One or more of the modules of the terminal device 104 may be interconnected. The connection(s) may be wireless or wired. In some embodiments, at least a portion of the terminal device 104 may be implemented on the processing device 200 as illustrated in FIG. 2 or the mobile device 300 as illustrated in FIG. 3.

The transmitting module 460 may transmit a connection request to a network access device.

When the terminal device 104 is to be connected to a network (e.g., a WIFI network), the transmitting module 460 may send a connection request to the network access device 102. In some embodiments, the connection request may include request content, information of the terminal device, etc. The request content may include, for example, a connection to a particular WIFI network, an Internet protocol (IP) address for connecting to the particular WIFI network, connection configuration information (e.g., subnet masks, a standard gateway, a DNS server, proxy configurations), etc.

In some embodiments, the transmitting module 460 may transmit response information regarding a challenge request to the network access device 102. After the challenge request for authenticating the terminal device 104 is received, the terminal device 104 may generate response information regarding the challenge request. The response information may include identity information of the terminal device. Merely by way of example, the response information may include a random number and a PTK. The transmitting module 460 may transmit the response information to the network access device 102. In some embodiments, the response information may be in the form of a message. For example, the response information may be a message of a handshake protocol (e.g., the four-way handshake protocol).

The obtaining module 470 may obtain a challenge request for authenticating the terminal device 104 from the network access device 102.

In some embodiments, upon receiving the connection request of the terminal device 104, the network access device 102 (e.g., the processing component of the network access device 102) may authenticate the terminal device 104. In some embodiments, the network access device 102 may authenticate the terminal device 104 by forwarding a challenge request to the obtaining module 470. The challenge request may include a request for identity information of the terminal device 104. In some embodiments, the challenge request may be in the form of a message.

In some embodiments, the obtaining module 470 may also obtain a verified IP address from the network access device 102 after the terminal device 104 is authenticated. In some embodiments, the obtaining module 470 may obtain the verified IP address in a handshake protocol. The handshake protocol may involve standards set up for the construction and use of the network, and provide a secure authentication for data delivered through the network. In some embodiments, the network access device 102 and the terminal device 104 may exchange information through the handshake protocol.

In some embodiments, the handshake protocol may be a four-way handshake protocol. The four-way handshake may be implemented by transmission of four EAPOL messages. In some embodiments, the verified IP address may be embodied in one of the four EAPOL messages. For example, the verified IP address may be embodied in an IE field of an EAPOL message in the four-way handshake. The obtaining module 470 may obtain the verified IP address from the EAPOL message, and connect to the network via the network access device 102 using the verified IP address.

The connection module 480 may connect the terminal device 104 to the network through the network access device 102 using the verified IP address.

The connection module 480 may set a networking IP address of the terminal device 104. The networking IP address refers to an IP address used for configuring the terminal device 104 so as to establish a connection to a network (e.g., a WIFI network). If the messages of the four-way handshake include an IP address, the connection module 480 may set a networking IP address base on the IP address in the messages of the four-way handshake. In some embodiments, the IP address in the messages of the four-way handshake may be used to update or replace a primary IP address (e.g., 0.0.0.0) of the terminal device.

If none of the messages include an IP address, the connection module 480 may receive the IP address generated by a selected server in a DHCP interaction process, and set the networking IP address base on the IP address generated by the selected server in the DHCP interaction process. In some embodiments, the IP address generated by the selected server in the DHCP interaction process may be used to update or replace the primary IP address of the terminal device.

It should be noted that the above description of the terminal device 104 is merely provided for the purposes of illustration, and not intended to limit the scope of the present disclosure. For persons having ordinary skills in the art, multiple variations and modifications may be made under the teachings of the present disclosure. For example, the terminal device 104 may further include a storage module facilitating data storage. However, those variations and modifications do not depart from the scope of the present disclosure.

Figure 5:
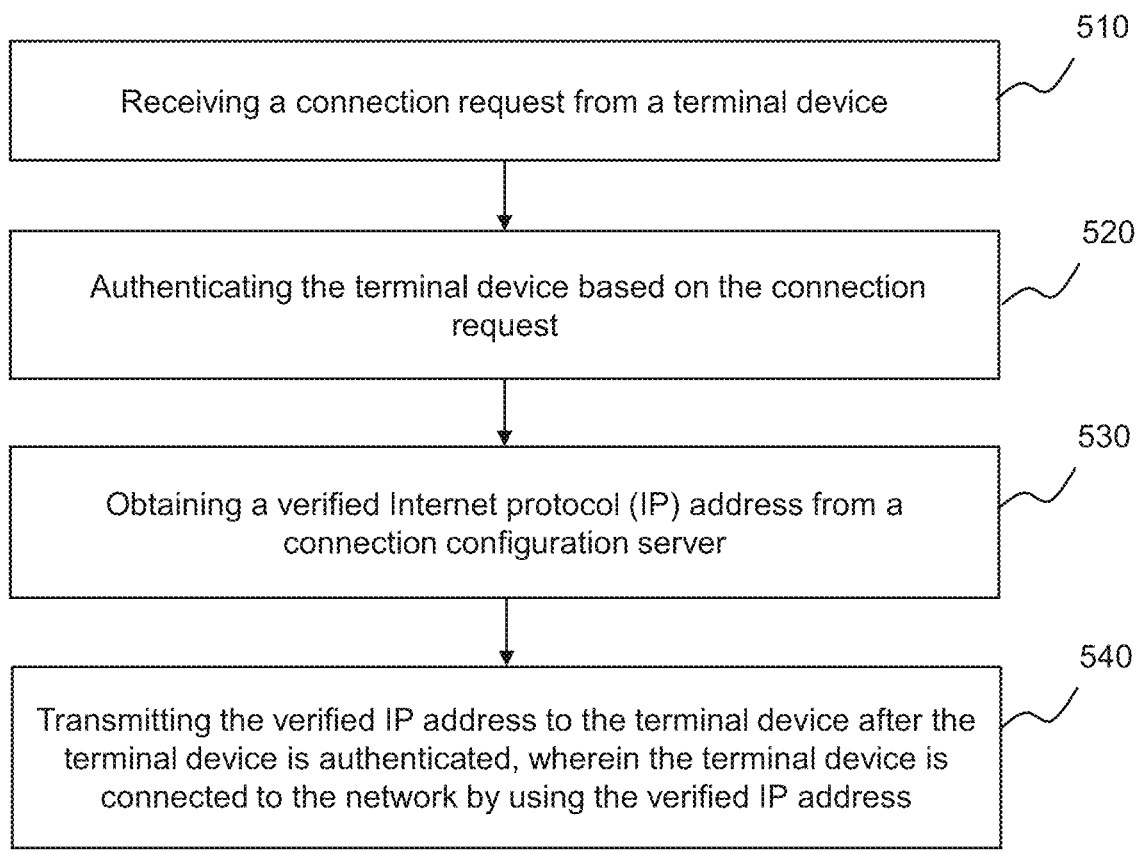
FIG. 5 is a flowchart illustrating an exemplary process for connecting a terminal device to a network through a network access device according to some embodiments of the present disclosure.

FIG. 5 is a flowchart illustrating an exemplary process for connecting a terminal device to a network through a network access device according to some embodiments of the present disclosure. In some embodiments, the process 500 shown in FIG. 5 may be implemented in the network connection system 100 illustrated in FIG. 1. For example, at least a part of the process 500 may be stored in a storage device (e.g., the storage component of the network access device, the DISK 270 of the processing device 200) as a form of instructions, and invoked and/or executed by the processing component (e.g., the processor 220 of the processing device 200, one or more modules illustrated in FIG. 4A). In some embodiments, a part of the process 500 may be implemented on a terminal device. The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, the process 500 may be implemented by the processing component of the network access device 102.

In 510, the processing component (e.g., the processor 220) may receive a connection request from a terminal device.

The network access device 102 may monitor connection requests sent by surrounding terminal devices (e.g., terminal device(s) 104 in a certain range centered by the network access device 102). In some embodiments, the network access device may monitor connection requests sent by surrounding terminal devices in real time. For example, the network access device 102 may check whether there is a connection request sent by a terminal device per unit time (e.g., per second). In some embodiments, the network access device 102 may monitor connection requests sent by surrounding terminal devices at a time interval. For example, the network access device 102 may check whether there is a connection request sent by a terminal device at a regular interval (e.g., at an interval of 30 seconds) or an irregular interval.

In some embodiments, the connection request of a terminal device (e.g., the terminal device 104) may include request content, information of the terminal device, etc. The request content refers to content that the terminal device 104 requests in the connection request. For example, the request content may include a connection to a particular WIFI network and an Internet protocol (IP) address for connecting to the particular WIFI network. In some embodiments, the connection request may include at least one request parameter. The request content may be implemented in the at least one request parameter. In some embodiments, the at least one request parameter may include a primary IP address of the terminal device 104, for example, 0.0.0.0. The information of the terminal device 104 may include, for example, an identity (ID) of the terminal device 104, a type of the terminal device 104, a geographic location of the terminal device 104, historical network access records of the terminal device 104, basic information of the user of the terminal device 104 (e.g., an age of the user, habits or preferences of the user, etc.), or the like, or any combination thereof.

In 520, the processing component (e.g., the processor 220) may authenticate the terminal device based on the connection request.

In some embodiments, upon receiving the connection request, the processing component may authenticate the terminal device 104 by recognizing identity information of the terminal device 104. The identity information may include, for example, an identity (ID) number, one or more keys, etc., of the terminal device 104. In some embodiments, in order to recognize the identity information of the terminal device 104, the processing component may transmit a challenge request to the terminal device 104. In some embodiments, the challenge request may include a request for the identity information of the terminal device. The terminal device 104 may generate response information regarding the challenge request and transmit the response information to the processing component. The response information may include the identity information of the terminal device 104. Merely for illustration purposes, the identity information of the terminal device 104 may be pre-stored in a storage component of the terminal device 104 capable of storing data (e.g., the storage 390). As another example, the processing component may forward an interface on the terminal device 104 to enable the user of the terminal device 104 to fulfill the authentication. The user may input information including, for example, a password, and/or a verification code on the interface. The identify information may be generated based at least in part on the information input by the user.

Upon receiving the response information, the processing component may recognize the identity information of the terminal device 104. In some embodiments, the processing component may recognize the identity information of the terminal device 104 by comparing the identity information input by the user to pre-stored identity information (e.g., a pairwise transient key (PTK)) of the terminal device 104. The processing component may retrieve the pre-stored identity information of the terminal device 104, and calculate a first value of a parameter (e.g., a value of a message integrity check (MIC)) based on the pre-stored identity information. Then the processing component may compare, for example, the value of parameter to a second value of the parameter generated based on the identity information in the response information of the terminal device 104. If the first value equals to the second value, the authentication of the terminal device 104 may succeed. If the first value is different from the second value, the authentication may fail.

In 530, the processing component (e.g., the processor 220) may obtain a verified IP address from the connection configuration component.

In some embodiments, the connection configuration component of the network access device 102 may be a DHCP server. The DHCP server may assign an IP address for the terminal device dynamically. In some embodiments, the IP address generated by the DHCP server may be verified according to a verification approach in the network access device 102. The IP address verified according to the verification approach may also be referred to as verified IP address. In some embodiments, the DHCP server may also provide connection configuration information for the terminal device 104 dynamically. The connection configuration information may include, for example, subnet masks, standard gateways, DNS servers, proxy configurations, etc.

In some embodiments, the DHCP server may generate a candidate IP address for the terminal device 104 and transmit the candidate IP address to the processing component. The processing component may verify a validity of the candidate IP address according to the verification approach. In some embodiments, the verification approach may include detecting an IP address conflict regarding the candidate IP address in the network. If none IP address conflict regarding the candidate IP address is detected in the network (i.e., the candidate IP address is valid), the processing component may designate the candidate IP address as the verified IP address. More details regarding the obtaining of the verified IP address can be found elsewhere in the present disclosure, for example, FIG. 6 and the descriptions thereof.

In 540, the processing component (e.g., the processor 220) may transmit the verified IP address to the terminal device after the terminal device is authenticated. The terminal device may be connected to the network using the verified IP address.

After the terminal device is authenticated, the verified IP address may be transmitted to the terminal device 104 such that a connection between the terminal device 104 and the network may be established using the verified IP address. In some embodiments, the verified IP address may be sent to the terminal device 104 in a handshake protocol. As used herein, the handshake protocol refers to a type of network authentication protocol that facilitates identity recognition between the network access device 102 and the terminal device 104. The handshake protocol may involve standards set up for the construction and use of the network, and provide a secure authentication for data delivered through the network. For example, the handshake protocol may enable the selection of encryption algorithms, verification code algorithms, related keys used in the connection, etc. In some embodiments, the network access device 102 and the terminal device 104 may exchange information through the handshake protocol. In some embodiments, the authentication of the terminal device in 520 may be a part of the handshake protocol. For example, the authentication of the terminal device in 520 may be implemented by the handshake protocol. In the handshake, the network access device 102 may forward the verified IP address to the terminal device (e.g., via a message of the handshake).

The handshake protocol may include a three-way handshake protocol, a four-way handshake protocol, etc. For illustration purposes, the four-way handshake protocol may be implemented by transmission of four messages. In some embodiments, the verified IP address may be embodied in one of the four messages. For example, the processing component may fill the verified IP address into an information element (IE) field of an extensible authentication protocol over local area network (EAPOL) message in the four-way handshake. The verified IP address may be transmitted to the terminal device 104 through the EAPOL message. The terminal device may obtain the verified IP address from the EAPOL message, and connect to the network (e.g., the particular WIFI network) via the network access device 102 using the verified IP address.

In view of the embodiments set forth above, the network access device 102 may be implemented as a DHCP agent, so that an interaction process related to the DHCP may be fulfilled by components of the network access device 102. Conventional interactions related to the DHCP between the network access device 102 and the terminal device 104 may be omitted, thus avoiding failures such as message loss during the conventional interaction process and improving a success rate of the network connection. In some embodiments, when the terminal device 104 is to be connected to the network, the interaction process related to the DHCP between components of the network access device 102 may be performed in advance, thus improving the efficiency of the network connection.

It should be noted that the above description is merely provided for the purposes of illustration, and not intended to limit the scope of the present disclosure. For persons having ordinary skills in the art, multiple variations and modifications may be made under the teachings of the present disclosure. For example, an executive subject of the operations 510 through 540 may be the network access device 102, instead of the processing component and the connection configuration component. Accordingly, the operation 530 may be that the network access device 102 may generate a verified IP address from the connection configuration component. However, these variations and modifications fall in the scope of the present disclosure.

Figure 6:
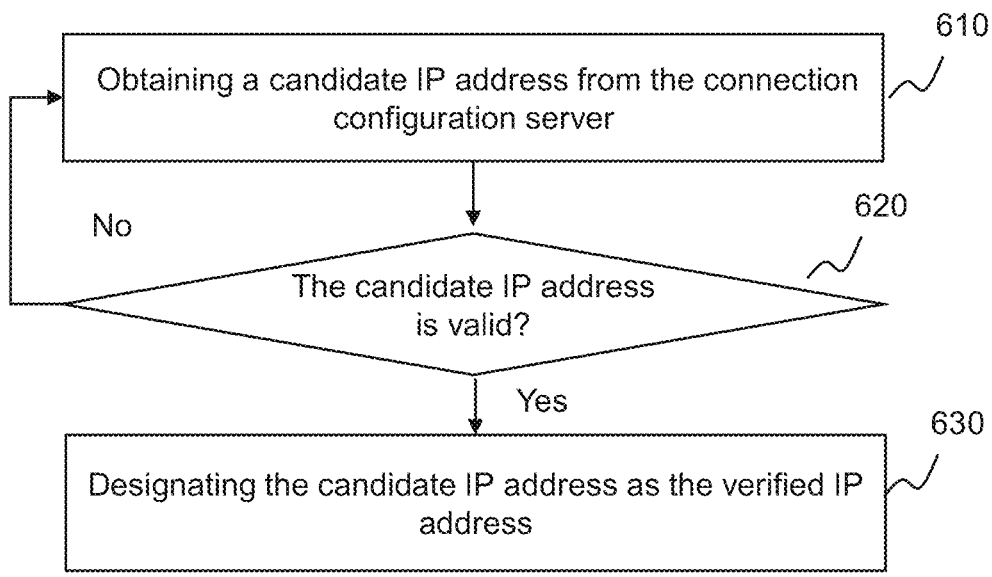
FIG. 6 is a flowchart illustrating an exemplary process for obtaining a verified IP address according to some embodiments of the present disclosure.

FIG. 6 is a flowchart illustrating an exemplary process for obtaining a verified IP address according to some embodiments of the present disclosure. In some embodiments, the process 600 shown in FIG. 6 may be implemented in the network connection system 100 illustrated in FIG. 1. For example, at least a part of the process 600 may be stored in a storage device (e.g., the storage component of the network access device, the DISK 270 of the processing device 200) as a form of instructions, and invoked and/or executed by the processing component (e.g., the processor 220 of the processing device 200, one or more modules illustrated in FIG. 4A). In some embodiments, a part of the process 600 may be implemented on a terminal device. The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, the operation 530 of the process 500 in FIG. 5 may be performed according to the process 600. In some embodiments, the process 600 may be implemented by the network access device 102. The network access device 102 may include the processing component and the connection configuration component. In some embodiments, the process 600 may be implemented by the processing component of the network access device 102.

In 610, the processing component (e.g., the processor 220) may obtain an IP address from the connection configuration component.

In some embodiments, the connection configuration component may be a DHCP server. The DHCP server may assign an IP address for the terminal device 104 dynamically. The DHCP server may transmit the IP address to the processing component. The obtained IP address may be an IP address to be verified. The IP address to be verified may also be referred to as a candidate IP address.

In 620, the processing component (e.g., the processor 220) may verify a validity of the IP address.

The processing component may obtain the candidate IP address, and verify a validity of the candidate IP address according to a verification approach. In some embodiments, the verification approach may include detecting an IP address conflict regarding the candidate IP address in the network. In some embodiments, the network access device 102 may associate with other terminal devices. After the network access device 102 obtains the candidate IP address, the network access device 102 may compare the candidate IP address with IP addresses used by other terminal devices. For example, the network access device 102 may broadcast the obtained candidate IP address to the network according to an address resolution protocol (ARP) protocol so as to compare the candidate IP address with IP addresses used by other terminal devices. As another example, the network access device 102 may record an IP address assigned to each of the other terminal devices associated with the network access device 102 when the terminal device connects to a network using the assigned IP address. The network access device 102 may retrieve the recorded IP addresses used by the other terminal devices, and compare the candidate IP address with recorded IP addresses. If the candidate IP address is the same as an IP address used by another terminal device associated with the network access device 102, it may indicate that an IP address conflict regarding the candidate IP address is detected in the network. In this case, the processing component may determine that the candidate IP address is invalid. The process 600 may proceed to 610, in which the processing component may obtain a new IP address from the connection configuration component, and verify a validity of the new IP address according to the verification approach in 620.

If none of the IP addresses used by other terminal devices is the same as the candidate IP address, it may indicate that there is no IP address conflict regarding the candidate IP address in the network. In this case, the processing component may determine that the candidate IP address is valid. The process 600 may proceed to 630.

In 630, the processing component (e.g., the processor 220) may designate the IP address as the verified IP address.

If there is no IP address conflict regarding the candidate IP address in the network, the processing component may designate the candidate IP address as the verified IP address. The verified IP address may be transmitted to the terminal device 104. The terminal device 104 may be connected to the network using the verified IP address. Since the verification of IP address is fulfilled by the network access device 102 itself (components of the network access device 102), thus avoiding failures such as message loss in a conventional verification process of IP address between the network access device 102 and the terminal device 104. In the meanwhile, the efficiency and success rate of the network connection may be improved.

Figure 7:
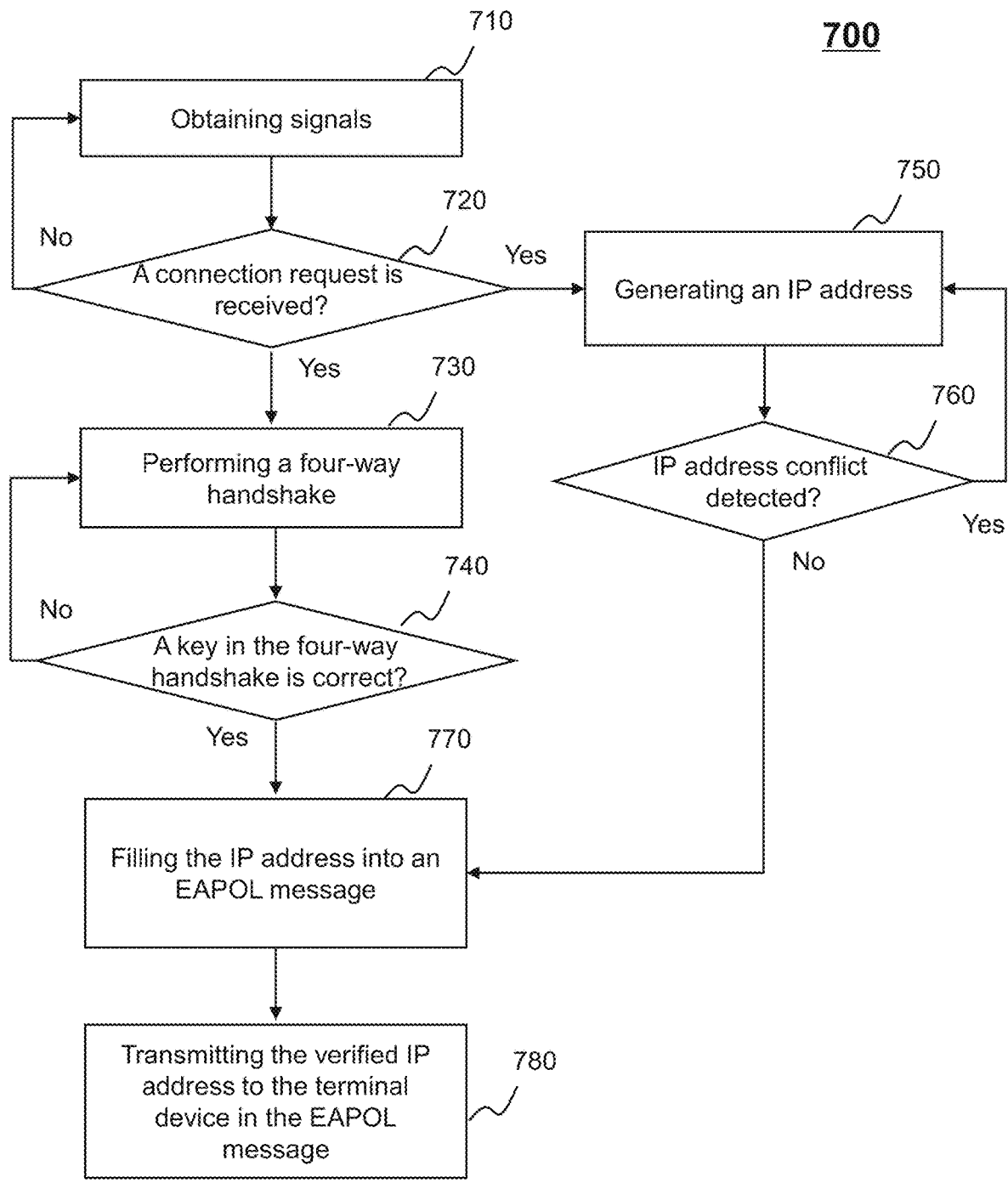
FIG. 7 is a flowchart illustrating an exemplary process for connecting a terminal device to a network through a network access device according to some embodiments of the present disclosure.

FIG. 7 is a flowchart illustrating an exemplary process for connecting a terminal device to a network through a network access device according to some embodiments of the present disclosure. In some embodiments, the process 500 shown in FIG. 5 may be implemented in the network connection system 100 illustrated in FIG. 1. For example, at least a part of the process 500 may be stored in a storage device (e.g., the storage component of the network access device, the DISK 270 of the processing device 200) as a form of instructions, and invoked and/or executed by the processing component (e.g., the processor 220 of the processing device 200, one or more modules illustrated in FIG. 4A). In some embodiments, a part of the process 500 may be implemented on a terminal device. The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, the process 500 may be implemented by the network access device 102. In some embodiments, the process 500 may also be implemented by the processing component of the network access device 102.

In 710, the network access device 102 may obtain signals.

In some embodiments, the network access device 102 may include at least one antenna. The at least one antenna may obtain signals from terminal devices 104 in a certain range centered by the network access device 102. For example, the at least one antenna may obtain signals from terminal devices 104 in a circular area with a radius of 3 meters, 5 meters, 10 meters, etc.

In some embodiments, the network access device 102 may obtain signals from the terminal device(s) 104 in real time (e.g., per unit time). In some embodiments, the network access device 102 may obtain signals from the terminal device(s) 104 at certain intervals. For example, the network access device 102 may obtain signals from the terminal device(s) 104 at a regular interval (e.g., at an interval of 30 seconds) or an irregular interval.

In 720, the network access device 102 may determine whether a connection request is received.

Upon obtaining a signal from a terminal device 104, the network access device 102 may determine whether the obtained signal is a connection request. The connection request may be a request for connecting the terminal device 104 to a network (e.g., a WIFI network) through the network access device 102. If the obtained signal is a connection request, the process 700 may proceed to 730 and 750. If the obtained signal is not a connection request, the process 700 may return to 710, in which the network access device 102 may continue to obtain signals from surrounding terminal devices.

In 730, the network access device 102 may perform a four-way handshake.

The four-way handshake may be a type of network authentication protocol that facilitates identity recognition between the network access device 102 and the terminal device 104. In some embodiments, the four-way handshake may include an authentication of the terminal device 104. The four-way handshake may be implemented by transmission of four EAPOL messages. Merely for illustration purposes, the four EAPOL messages may include a first message including a first random value (e.g., ANonce) transmitted from the network access device 102 to the terminal device 104, a second message including a second random number (e.g., SNonce) and a pairwise transient key (PTK) transmitted from the terminal device 104 to the network access device 102, a third message including an MIC and a group transient key (GTK) transmitted from the network access device 102 to the terminal device 104, and a fourth message including acknowledgement (ACK) transmitted from the terminal device 104 to the network access device 102. To authenticate the terminal device 104, the network access device 102 (e.g., the processing component of the network access device 102) may forward a challenge request to the terminal device 104 via the first message. The challenge request may include a request for identity information of the terminal device 104.

The terminal device 104 may transmit response information regarding the challenge request to the network access device 102 via the second message after the terminal device receives the challenge request. The response information may include identity information of the terminal device 104. Merely by way of example, the response information may include an ID number and one or more keys. In some embodiments, the identity information in the response information may be input by a user instantaneously, pre-stored in the terminal device 104, etc. For example, the processing component may forward an interface on the terminal device 104 to enable the user of the terminal device 104 to fulfill the authentication. The user may input information including, for example, an ID number, a password, and/or a verification code on the interface. The input information may be processed and filled in the second message. As another example, the identity information may be pre-stored in a storage device capable of storing data (e.g., the storage 390). Upon receiving the challenge request from the network access device 102, the terminal device 104 may retrieve the identity information from the storage device, and forward the identity information to the network access device 102 in a message of the response information.

In 740, the network access device 102 may determine whether a key received in the four-way handshake is correct.

The network access device 102 may verify the key (e.g., the PTK) received in the response information of the terminal device 104. In some embodiments, the network access device 102 may retrieve, from a storage device, pre-stored identity information (e.g., a pre-stored key) of the terminal device 104. The network access device 102 may compare the key in the response information of the terminal device 104 to the pre-stored key. If the key in the response information is the same as the pre-stored key, it may indicate that the key received in the four-way handshake is correct, and the process 700 may proceed to 770. If the key in the response information is different from the pre-stored key, it may indicate that the key received in the four-way handshake is incorrect, and the process 700 may return to 730 for a further authentication by, for example, performing another four-way handshake.

In 750, the network access device 102 may generate an IP address for the terminal device.

In some embodiments, the connection configuration component of the network access device 102 may be a DHCP server. The DHCP server may generate an IP address for the terminal device 104 dynamically. The generated IP address may be an IP address to be verified. The IP address to be verified may also be referred to as a candidate IP address.

In 760, the network access device 102 may determine whether an IP address conflict is detected.

In some embodiments, the network access device 102 may associate with other terminal devices. After the network access device 102 obtains the candidate IP address, the network access device 102 may determine whether an IP address conflict is detected by comparing the candidate IP address with IP addresses used by other terminal devices. In some embodiments, the determination of the IP address conflict regarding the generated IP address is the same as or similar to the operations 610 through 630 in the process 600, and will not be repeated here.

In 770, the network access device 102 may fill the IP address into an EAPOL message.

If the key in the four-way handshake is correct, the network access device 102 may fill the IP address into an EAPOL message. The selected EAPOL message may be one (e.g., the third message) of four EAPOL messages of the four-way handshake. Merely by way of example, the network access device 102 may fill the IP address into an IE field of the EAPOL message in the four-way handshake.

In 780, the network access device 102 may transmit the verified IP address to the terminal device in the EAPOL message.

After the verified IP address is filled into the EAPOL message of the four-way handshake, the network access device 102 may transmit the verified IP address to the terminal device 104 via the EAPOL message. The terminal device 104 may obtain the verified IP address from the EAPOL message, and connect to the network via the network access device 102 using the verified IP address.

It should be noted that the above description is merely provided for the purposes of illustration, and not intended to limit the scope of the present disclosure. For persons having ordinary skills in the art, multiple variations and modifications may be made under the teachings of the present disclosure. For example, the operations 730-740 and the operations 750-760 may be performed in parallel. As another example, the operations 750-760 may be performed before the operations 730-740. However, these variations and modifications fall in the scope of the present disclosure.

Figure 8:
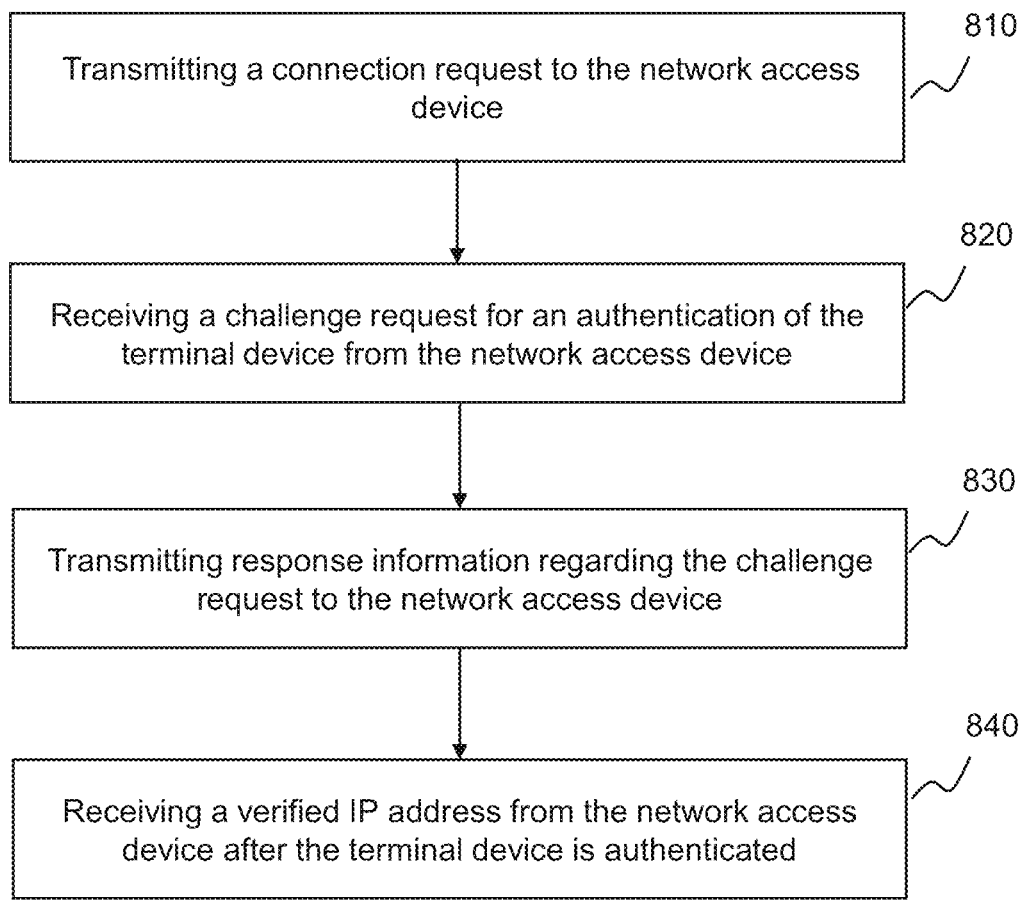
FIG. 8 is a flowchart illustrating an exemplary process for connecting a terminal device to a network through a network access device according to some embodiments of the present disclosure.

FIG. 8 is a flowchart illustrating an exemplary process for connecting a terminal device to a network through a network access device according to some embodiments of the present disclosure. In some embodiments, the process 800 shown in FIG. 8 may be implemented in the network connection system 100 illustrated in FIG. 1. For example, at least a part of the process 800 may be stored in a storage device (e.g., the storage 390 of the terminal device 300) as a form of instructions, and invoked and/or executed by a processing device (e.g., the CPU of the terminal device 300, one or more modules illustrated in FIG. 4B). The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, the process 800 may be implemented by the terminal device 104.

In 810, the terminal device 104 may transmit a connection request to a network access device.

When the terminal device 104 is to be connected to a network (e.g., a WIFI network), the terminal device 104 may send a connection request to the network access device 102.

In some embodiments, the connection request may include request content, information of the terminal device, etc. The request content may include, for example, a connection to a particular WIFI network, an Internet protocol (IP) address for connecting to the particular WIFI network, connection configuration information (e.g., subnet masks, a standard gateway, a DNS server, proxy configurations), etc. The information of the terminal device 104 may include, for example, an ID number of the terminal device 104, a type of the terminal device 104, a geographic location of the terminal device 104, historical network access records of the terminal device 104, basic information of the user of the terminal device 104 (e.g., an age of the user, preferences of the user, etc.), or the like, or any combination thereof.

In 820, the terminal device 104 may receive a challenge request for authenticating the terminal device from the network access device.

In some embodiments, upon receiving the connection request of the terminal device 104, the network access device 102 (e.g., the processing component of the network access device 102) may authenticate the terminal device 104. In some embodiments, the network access device 102 may authenticate the terminal device 104 by forwarding a challenge request to the terminal device 104. The challenge request may include a request for identity information of the terminal device 104. The identity information of the terminal device 104 may include, for example, an identity (ID) number, a verification code, one or more key, etc., of the terminal device 104. In some embodiments, the challenge request may be in the form of a message. For example, the challenge request may be a message of a handshake protocol (e.g., a four-way handshake protocol).

In 830, the terminal device 104 may transmit response information regarding the challenge request to the network access device.

After the challenge request for authenticating the terminal device 104 is received, the terminal device 104 may generate response information regarding the challenge request. The response information may include identity information of the terminal device. Merely by way of example, the response information may include a random number and a PTK. The terminal device 104 may transmit the response information to the network access device 102. In some embodiments, the response information may be in the form of a message. For example, the response information may be a message of a handshake protocol (e.g., the four-way handshake protocol).

In 840, the terminal device 104 may receive a verified IP address from the network access device after the terminal device is authenticated. The terminal device 104 may be configured to be connected to the network through the network access device 102 using the verified IP address.

The network access device 102 may receive the response information from the terminal device 104, and check the content (e.g., the key) of the response information. If the response information from the terminal device is correct, the network access device 102 may generate a verified IP address, and transmit the verified IP address to the terminal device 104. In some embodiments, the verified IP address may be obtained according to the operations 610 through 630 of the process 600 in FIG. 6.

In some embodiments, the terminal device 104 may receive the verified IP address in a handshake protocol. The handshake protocol may involve standards set up for the construction and use of the network, and provide a secure authentication for data delivered through the network. In some embodiments, the network access device 102 and the terminal device 104 may exchange information through the handshake protocol.

In some embodiments, the handshake protocol may be a four-way handshake protocol. The four-way handshake may be implemented by transmission of four EAPOL messages. In some embodiments, the verified IP address may be embodied in one of the four EAPOL messages. For example, the verified IP address may be embodied in an IE field of an EAPOL message in the four-way handshake. The terminal device 104 may obtain the verified IP address from the EAPOL message, and connect to the network via the network access device 102 using the verified IP address.

In the process of connecting the terminal device 104 with the network access device 102, the verified IP address may be obtained from the network access device directly. In other words, the terminal device 104 does not need to check the validation of the IP address it receives through a plurality of interactions with the network access device 102, which may reduce the possibility of message loss during the plurality of interactions between the terminal device 104 and the network access device 102, and improve a success rate and efficiency of network connection.

It should be noted that the above description is merely provided for the purposes of illustration, and not intended to limit the scope of the present disclosure. For persons having ordinary skills in the art, multiple variations and modifications may be made under the teachings of the present disclosure. For example, the operations 820 and 830 in the process 800 may be a part of a handshake protocol for authenticating the terminal device 140. However, these variations and modifications fall in the scope of the present disclosure.

Figure 9:
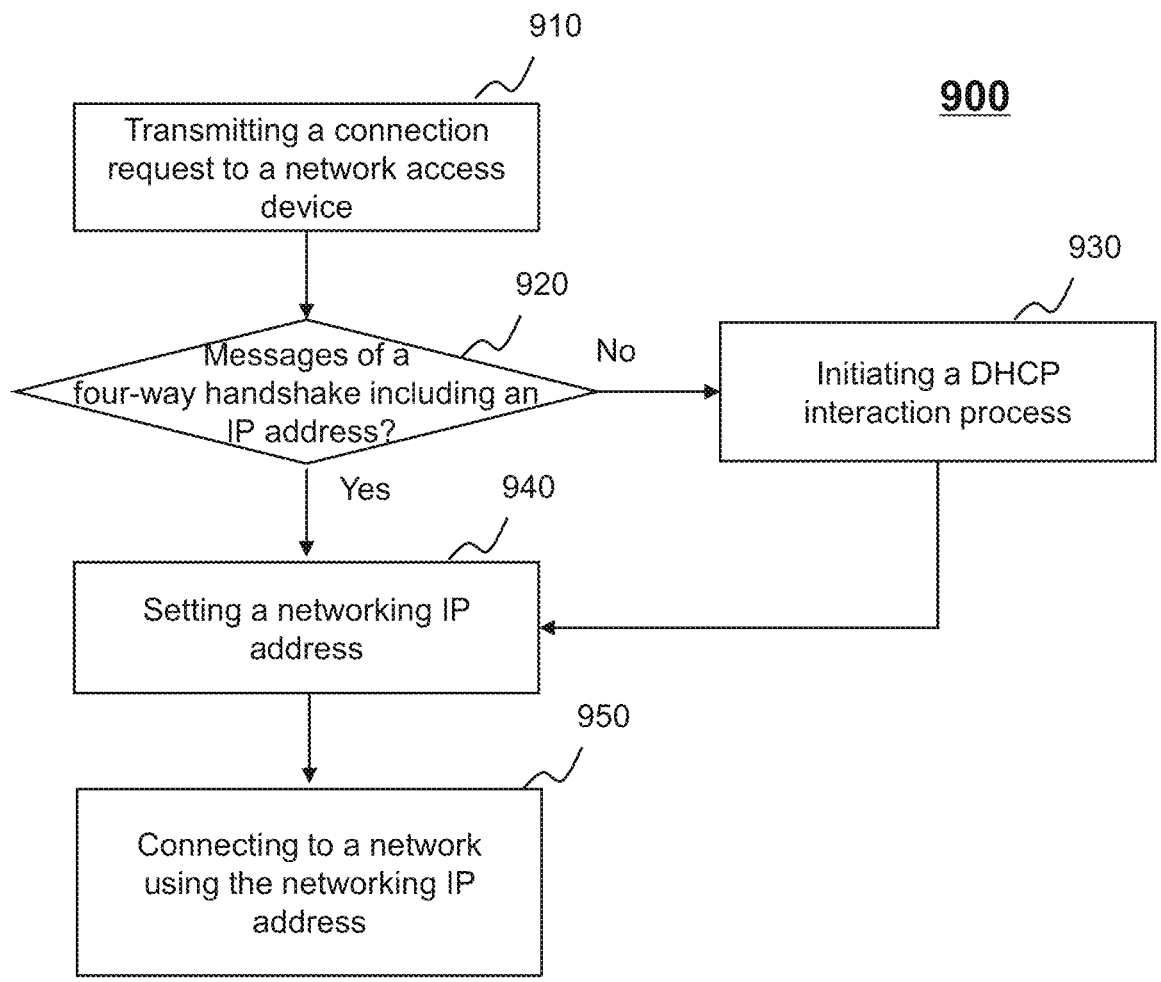
FIG. 9 is a flowchart illustrating an exemplary process for connecting a terminal device to a network through a network access device according to some embodiments of the present disclosure.

FIG. 9 is a flowchart illustrating an exemplary process for connecting a terminal device to a network through a network access device according to some embodiments of the present disclosure. In some embodiments, the process 900 shown in FIG. 9 may be implemented in the network connection system 100 illustrated in FIG. 1. For example, at least a part of the process 900 may be stored in a storage device (e.g., the storage 390 of the terminal device 300) as a form of instructions, and invoked and/or executed by a processing device (e.g., the CPU 340 of the terminal device 300, one or more modules illustrated in FIG. 4B). The operations of the illustrated process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting. In some embodiments, the process 900 may be implemented by the terminal device 104.

In 910, the terminal device 104 may transmit a connection request to a network access device.

In some embodiments, the operation 910 may be similar to or the same as the operation 810 of the process 800 in FIG. 8, which will not be repeated here.

In 920, the terminal device may determine whether messages of a four-way handshake include an IP address.

After the network access device 102 receives the connection request from the terminal device 104, the network access device 102 may authenticate the terminal device 104. In some embodiments, the network access device 102 may perform a four-way handshake. The four-way handshake may be implemented as messages transmitted between the terminal device 104 and the network access device 102.

When the terminal device 104 receives messages of the four-way handshake, the terminal device 104 may determine whether messages of the four-way handshake include an IP address. If one of the messages of the four-way handshake includes an IP address, the process may proceed to 930. If none of the messages include an IP address, the process may proceed to 940.

In 930, the terminal device 104 may initiate a DHCP interaction process.

If none of the messages include an IP address, the terminal device 104 may initiate a DHCP interaction process with the network access device 102. In some embodiments, the DHCP interaction process may be performed according to conventional DHCP server/client interactions. The DHCP interaction process may include, for example, that the terminal device 104 sends out a DHCPDISCOVER message requesting an IP address, any DHCP server that receives the DHCPDISCOVER message sends a DHCPOFFER message in response, the terminal device 104 sends a DHCPREQUEST message to accept an offer to a selected server, the selected server generates an IP address, and marks the IP address as leased, the terminal device detects an IP address conflict in an address resolution protocol (ARP) broadcast, etc. If no IP address conflict is detected, the DHCP interaction process may terminate, and the terminal device 104 may obtain the IP address generated by the selected server. Otherwise, the operations in the DHCP interaction process may be repeated until a valid IP address is obtained.

In 940, the terminal device 104 may set a networking IP address.

As used herein, the networking IP address refers to an IP address used for configuring the terminal device so as to establish a connection to a network (e.g., a WIFI network). If the messages of the four-way handshake include an IP address, the terminal device 104 may set a networking IP address base on the IP address in the messages of the four-way handshake. In some embodiments, the IP address in the messages of the four-way handshake may be used to update or replace the primary IP address (e.g., 0.0.0.0) of the terminal device. For example, if the IP address in the messages of the four-way handshake is 192.168.1.18, and the primary IP address is 0.0.0.0, the networking IP address of the terminal device may be set to 192.168.1.18, accordingly.

In some embodiments, the IP address in the messages of the four-way handshake may be generated by the network access device 102. The network access device 102 may include the connection configuration component. In some embodiments, the connection configuration component may be a DHCP server. The DHCP server may provide an IP address verified in the network access device 102 for the terminal device 104. In some embodiments, the network access device 102 may fill the verified IP address into a message of the four-way handshake. For example, the messages of the four-way handshake may include an EAPOL message. The network access device 102 may fill the IP address into an IE field of the EAPOL message in the four-way handshake.

If none of the messages include an IP address, the terminal device 104 may receive the IP address generated by the selected server in the DHCP interaction process, and set the networking IP address base on the IP address generated by the selected server in the DHCP interaction process. In some embodiments, the IP address generated by the selected server in the DHCP interaction process may be used to update or replace the primary IP address (e.g., 0.0.0.0) of the terminal device.

In 950, the terminal device 104 may connect to a network by using the networking IP address. The network may be a particular WLAN network.

It should be noted that the above description is merely provided for the purposes of illustration, and not intended to limit the scope of the present disclosure. For persons having ordinary skills in the art, multiple variations and modifications may be made under the teachings of the present disclosure. For example, the DHCP interaction process initiated in 940 may also be performed according to the operations 810 through 830 of the process 800 in FIG. 8. As another example, other connection configuration information such as subnet masks, standard gateways, DNS servers, proxy configurations, etc., may also be embodied in the messages of the handshake, and transmitted to the terminal device 104 in the handshake. The terminal device 104 may be configured based on the connection configuration information, and connected to the network through the network access device 102. However, these variations and modifications fall in the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for connecting a terminal device to a network through a network access device, the network access device including a processor and a connection configuration component, the method comprising:
receiving, by the processor, a connection request from the terminal device;
authenticating, by the processor, the terminal device based on the connection request;
obtaining, by the processor, a verified Internet protocol (IP) address from the connection configuration component; and
transmitting, by the processor, the verified IP address to the terminal device in a handshake protocol after the terminal device is authenticated, wherein the terminal device is configured to be connected to the network by using the verified IP address and the handshake protocol includes a four-way handshake, wherein the transmitting the verified IP address to the terminal device in the handshake protocol includes:
filling the verified IP address into an information element (IE) field of an extensible authentication protocol over local area network (EAPOL) message in the four-way handshake; and
transmitting the verified IP address to the terminal device through the EAPOL message.

2. The method of claim 1, wherein the IP address is verified according to a verification approach, the verification approach including:
obtaining a candidate IP address from the connection configuration component;
verifying a validity of the candidate IP address by detecting a conflict regarding the candidate IP address in the network; and
in response to that the candidate IP address is valid, designating the candidate IP address as the verified IP address.

3. The method of claim 2, further including:
in response to that the candidate IP address is invalid, obtaining a new IP address from the connection configuration component, and verifying a validity of the new IP address according to the verification approach.

4. The method of claim 1, wherein authenticating the terminal device based on the connection request includes:
transmitting a challenge request to the terminal device;
receiving response information regarding the challenge request from the terminal device; and
authenticating the terminal device based on the response information.

5. The method of claim 1, wherein the connection configuration component includes a dynamic host configuration protocol (DHCP) server.

6. A method for connecting a terminal device to a network through a network access device, the method comprising:
transmitting, by the terminal device, a connection request to the network access device;
receiving, by the terminal device, a challenge request for an authentication of the terminal device from the network access device;
transmitting, by the terminal device, response information regarding the challenge request to the network access device; and
receiving, by the terminal device, a verified Internet protocol (IP) address from the network access device in a handshake protocol after the terminal device is authenticated, wherein the terminal device is configured to be connected to the network via the verified IP address, the handshake protocol includes a four-way handshake, and the verified IP address is filled into an information element (IE) field of an extensible authentication protocol over local area network (EAPOL) message in the four-way handshake.

7. The method of claim 6, wherein the verified IP address is valid in the network.

8. The method of claim 6, wherein the connection configuration component includes a dynamic host configuration protocol (DHCP) server.

9. A network access device for connecting a terminal device to a network, the network access device including a processor and a connection configuration component, the processor being configured to perform operations comprising:
receiving a connection request from the terminal device;
authenticating the terminal device based on the connection request;
obtaining a verified Internet protocol (IP) address from the connection configuration component; and
transmitting the verified IP address to the terminal device in a handshake protocol after the terminal device is authenticated, wherein the terminal device is configured to be connected to the network by using the verified IP address and the handshake protocol includes a four-way handshake, wherein the transmitting the verified IP address to the terminal device in the handshake protocol includes:
filling the verified IP address into an information element (IE) field of an extensible authentication protocol over local area network (EAPOL) message in the four-way handshake; and
transmitting the verified IP address to the terminal device through the EAPOL message.

10. The network access device of claim 9, wherein the IP address is verified according to a verification approach, the verification approach including:
obtaining a candidate IP address from the connection configuration component;
verifying a validity of the candidate IP address by detecting a conflict regarding the candidate IP address in the network; and
in response to that the candidate IP address is valid, designating the candidate IP address as the verified IP address.

11. The network access device of claim 9, wherein authenticating the terminal device based on the connection request includes:
transmitting a challenge request to the terminal device;
receiving response information regarding the challenge request from the terminal device; and
authenticating the terminal device based on the response information.

\* \* \* \* \*